Nov. 6, 1934.  R. R. SEFT  1,979,413
SHEAR GUIDE
Filed April 12, 1933   3 Sheets-Sheet 1

INVENTOR
Rudolph R. Seft
By William B. Jaspert
Attorney.

Nov. 6, 1934.　　　R. R. SEFT　　　1,979,413
SHEAR GUIDE
Filed April 12, 1933　　3 Sheets-Sheet 2

INVENTOR
Rudolph R. Seft
by William B. Jaspert
Attorney.

Nov. 6, 1934.    R. R. SEFT    1,979,413
SHEAR GUIDE
Filed April 12, 1933    3 Sheets-Sheet 3

INVENTOR
Rudolph R. Seft
by William B. Jaspert
Attorney.

Patented Nov. 6, 1934

1,979,413

UNITED STATES PATENT OFFICE 1,979,413

SHEAR GUIDE

Rudolph R. Seft, Brackenridge, Pa.

Application April 12, 1933, Serial No. 665,693

6 Claims. (Cl. 164—59)

This invention relates to improvements in power shears, more particularly to guide mechanism operating to properly place the strip material in cooperative relation to the cutting blade of the shear.

It is among the objects of this invention to provide an alining mechanism for power shears for cutting "sheet bars", "breakdowns", or other steel sheets, which shall be of simple and durable mechanical construction and which shall be adapted to eliminate waste resulting from improper cutting operations of conventional forms of shearing mechanisms, by facilitating the accurate alinement of the material prior to its severance.

In the manufacture of steel sheet or strip, the steel ingot or a portion of an ingot is rolled out to what is termed a "sheet bar" and passed through shears and cut to lengths. This requires considerable handling on both ends of the shears, there being a so-called shear man that guides the sheet bar at the front end who is assisted by a leader that helps handle the breakdown or strip and there are commonly two operators on the back end of the shear termed "pilers" or "stackers" who assist in placing the end of the sheet bar in proper position for shearing to length.

In accordance with the present invention, the proper alinement of the sheet bar with the shear is accomplished mechanically by means of movable guides which not only act to set the piece for proper length but also provide for its accurate alinement with the cutting shear to assure that the cut-off piece is square.

Figure 1:
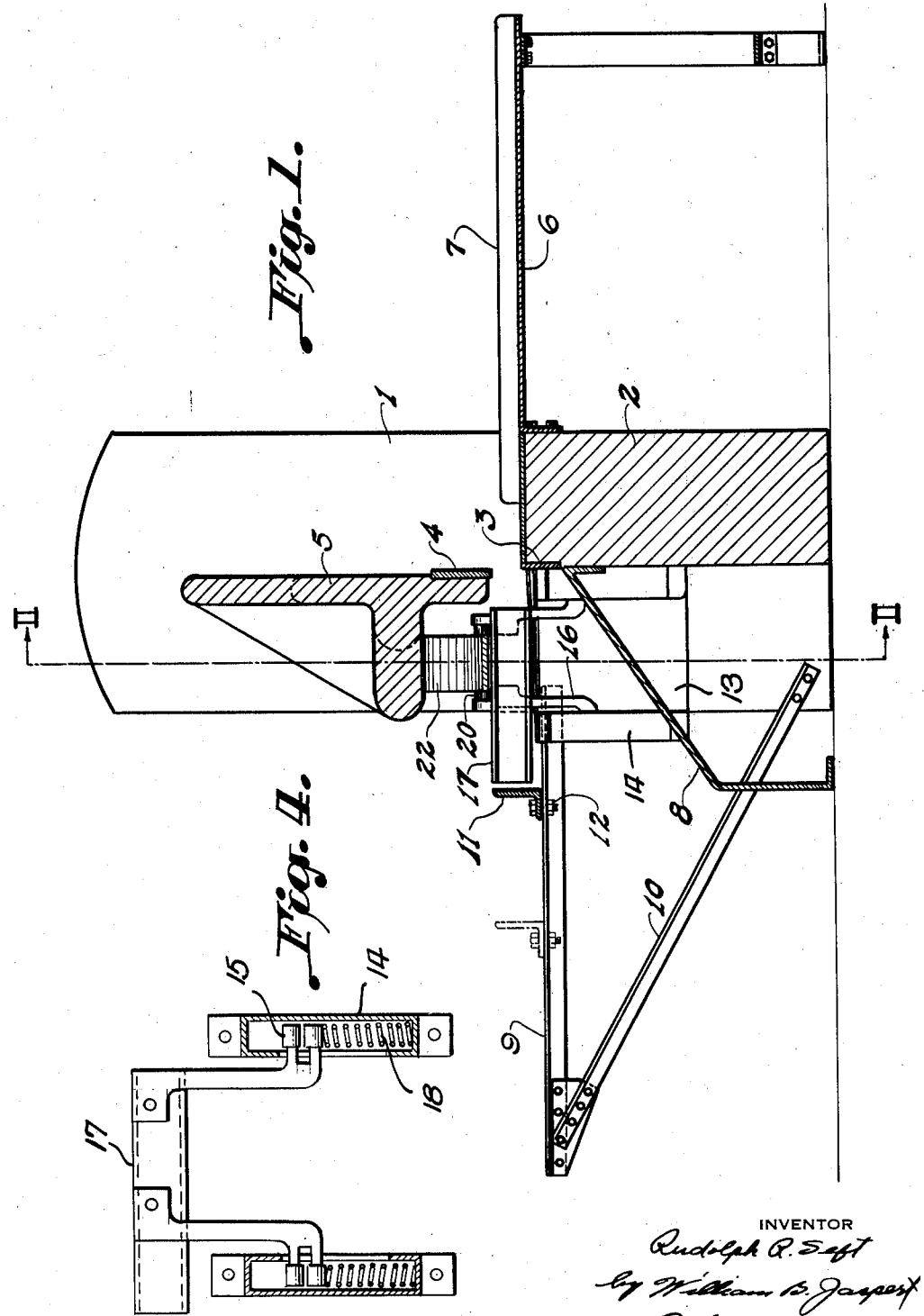
Figure 2:
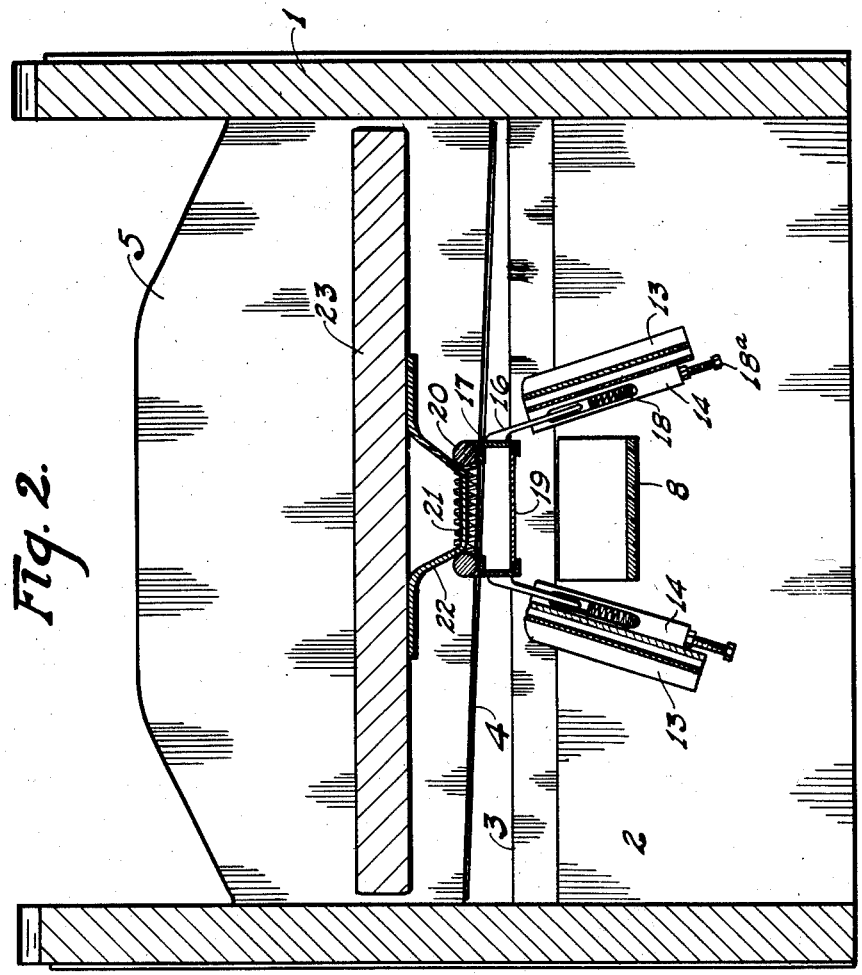
Figure 3:
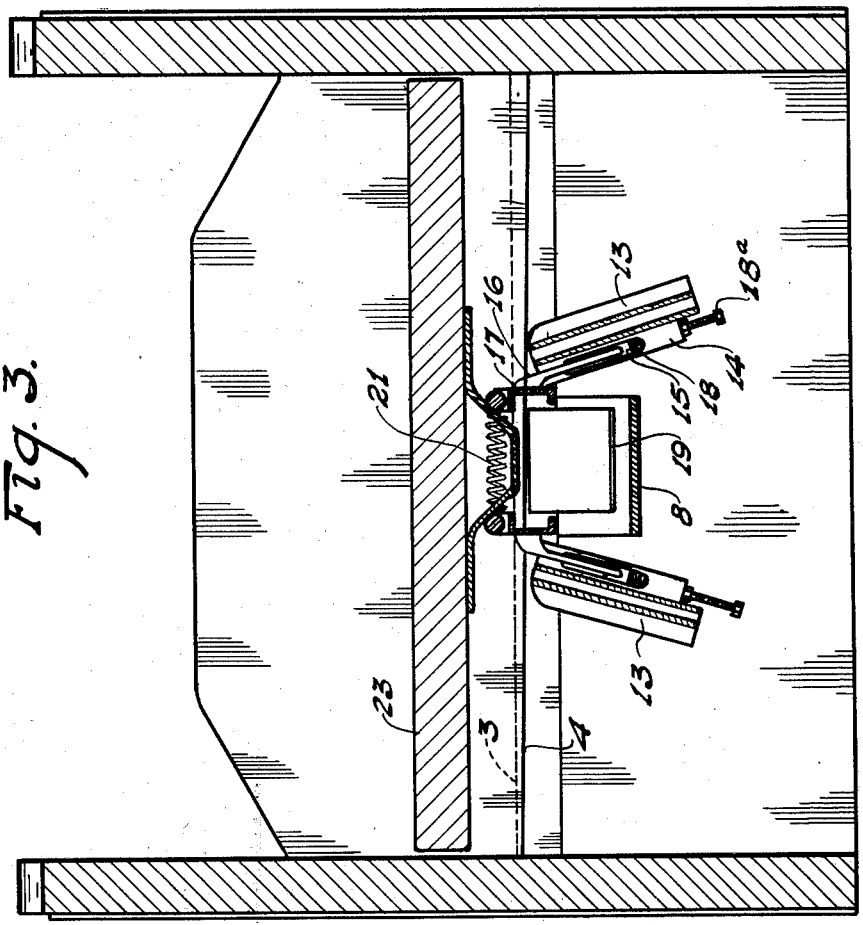

The construction of the device will become more apparent from a consideration of the accompanying drawings constituting a part hereof, in which like reference characters designate like parts, and in which Figure 1 is a vertical sectional elevational view taken longitudinally of a power shear embodying the principles of this invention; Figure 2, a transverse sectional view taken along the line II—II of Figure 1, showing the retracted position of the shear and guide mechanism; Figure 3, a similar view showing the cutting position of the shear and guide mechanism; and Figure 4, a side elevational view partially in section of the shear guide support.

With reference to the several figures of the drawings, the structure therein illustrated comprises a shear generally designated by the reference numeral 1 which may be of conventional form and the structural features of which constitute no part of the present invention.

The shear is provided with a shear block 2, having a stationary guide 3 adapted to cooperate with a movable blade 4 mounted on a shear bar 5 and adapted for vertical movement to effect a shearing of the material which is passed between the blades 3 and 4.

Secured to the block 2 is a table 6 having a guide rail 7 on one side against which the sheet bar is placed, and then pushed forward into the shear.

At the rear of the shear block 2 is a deflecting guide 8 on which the sheared off sheets fall and drop to the rear of the shear out of the way of the cutting mechanism.

A pair of angle bars 9 are secured in spaced relation to the back of the shear housing and are supported by bars 10 to mount an angle 11 which constitutes an end abutment for the sheet bar against which the end of the sheet is placed to determine the length to which it will be cut. The angle bar 11 is adapted for adjustment on the guide bars 9 as indicated by the dotted line construction, the bars being movably clamped by bolts 12 to the parallel bars 9.

On the rear of the shears are mounted a pair of stationary brackets 13 which are inclined as shown and provided with hollow guides 14 in which are mounted rollers 15 mounted on bifurcated ends of arms 16 on the ends of which are mounted guide channels 17, Figure 4. The plungers 15 are biased by coil springs 18 to normally retain their extended position as shown in Figure 2 of the drawings in which position the guide channels are in parallel alinement to engage the sides of a sheet bar designated by the reference numeral 19. The tension of springs 18 may be regulated by adjusting screws 18a.

Mounted on the guide channels 17 are rollers 20 having coil springs 21 secured transversely thereof to normally draw the rollers and their connected guide channels toward each other, and disposed between the rollers 20 is a flared guide or spreader 22 having curved surfaces or tracks for engagement with the rollers 20, the spreader 22 being secured to a ledge 23 provided on the shear bar 5 to be movable therewith.

While the cutting shears are only diagrammatically illustrated in the several figures of the drawings, they are intended to be operated in the conventional manner by subjecting the shear bar 5 to vertical movement and as the spreader 22 is mounted on the shear bar, it will move with the shears.

The operation of the above described mechanism is briefly as follows: The shear man moves the sheet bar forward on the supporting table 6 when the shear bar 5 is in the raised position as shown in Figure 1 of the drawings; the end abutment angle member 11 is adjusted the proper distance from the rear of the blades 3 and 4, and the guide channels 17 are in the position shown in Figure 2 of the drawings.

The guide channels function to maintain the sheet bar in such position that it cannot project above or below the end abutment 11 so that it will be held absolutely square with the shear without manipulations by the pilers at the rear of the shear, thereby avoiding the hazard of injury which was quite common for this operation with conventional shearing mechanism. When the breakdown is abutting against the angle bar 11, the shear man will operate a control such as a foot pedal to engage the shear clutch with the drive mechanism and the bar 5 will be moved downwardly causing the spreader 22 to displace the rollers 20 thereby spreading the guide channels 17 so that when the breakdown is sheared, it is free to drop on the inclined guide 8 and thence to the ground from which it is removed by the piler or stacker.

As the shear bar 5 retracts, the spreader 22 will raise and the retraction spring 21 and the coil spring 18 will restore the guide channels 17 to their normal position as shown in Figure 2 of the drawings. The shear man then advances the breakdown strip below the shears against the abutment 11 and the operation is repeated.

By employing the movable guide for alining the sheet bar, the piler at the rear of the shear need not handle the strip at all until after it has been sheared. As there is no need for handling the material before shearing, one of the pilers can be dispensed with. Also, the invention is particularly useful in the making of silicon steels which because of their silicon content are brittle in their cold state and must be heated for the shearing operation. Obviously, the heated strip is difficult to handle manually, and the guide mechanism herein disclosed eliminated the necessity for the handling of the hot sheets.

The invention also eliminates the production of scrap or waste resulting from misalinement of the sheet bar in the shear when such alinement was depending upon manipulation by the operator who had neither a good view or position for properly handling the end of the sheet.

Although one embodiment of the invention has been herein illustrated and described, it will be obvious to those skilled in the art that various modifications may be made in the details of construction without departing from the principles herein set forth.

I claim:—

1. The combination with shear mechanism of a work support and guide mechanism comprising a pair of channels mounted in parallel alinement and cooperating to engage the article to be severed therebetween, means yieldingly urging said guide members towards each other, and means operative in response to movement of the shear for spreading said guide members against the tension of said yielding means, and means independent of said first named means acting upon said guide members to intimately engage the article to be severed.

2. The combination with a shear mechanism of removable guides therefor, said guides comprising a pair of channels, a plurality of movable arms supporting said channels, spring means normally biasing said arms in a direction to urge said channels towards each other, rollers mounted on said channels, and a spreader in cooperative alinement with said rollers and operative in response to movement of the shear bars to engage said rollers to spread the channel members in the cutting movement of said shears.

3. A movable guide mechanism for handling sheet material or the like comprising a plurality of guide members adapted to engage and support the sheets, rollers carried by said guides, movable arms supporting said guides, spring means acting to urge said guides towards each other, and means operative to spread said rollers to cause the guides to disengage the sheet material.

4. The combination with a shear for cutting sheet bars or the like, of a stationary guide at the front of the shear, and a movable guide at the rear of the shear, said guides being in alinement, an adjustable member at the rear of the shear in alinement with the stationary guide constituting an end abutment for the sheet bar placed between the shears, means urging the movable guide members in engagement with the sheet bar, and means operative in response to the cutting movement of the shear for actuating said movable guide to disengage the severed sheet.

5. The combination with a shear mechanism of a movable guide therefor comprising a pair of work supporting and guiding members mounted on movable arms, spring means urging said arms in the direction to bring said movable guides into gripping engagement with the article to be sheared, rollers mounted on said movable guides, spring means connecting said rollers, and a spreader mounted on the shear bar and adapted to engage the rollers whereby the rollers and their connected guide members are separated to release the sheet severed by the shears.

6. The combination with a shear mechanism for cutting sheet bars or the like of a sheet supporting and guide mechanism comprising a pair of movable guides mounted in alinement with the shear block, an end abutment cooperating with said guides to determine the length of the sheet to be cut, rollers mounted on said guides, and means movable with said shears for engaging said rollers in the downward movement of the shears to spread the guides before the sheet bar is severed.

RUDOLPH R. SEFT.